US010556784B2

(12) United States Patent
Riegraf

(10) Patent No.: US 10,556,784 B2
(45) Date of Patent: Feb. 11, 2020

(54) LIFTING SYSTEM AND METHOD FOR LIFTING AND/OR LOWERING LOADS

(71) Applicant: EISENMANN SE, Boeblingen (DE)

(72) Inventor: Martin Riegraf, Reutlingen (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 15/773,267

(22) PCT Filed: Nov. 3, 2016

(86) PCT No.: PCT/EP2016/076605
§ 371 (c)(1),
(2) Date: May 3, 2018

(87) PCT Pub. No.: WO2017/077000
PCT Pub. Date: May 11, 2017

(65) Prior Publication Data

US 2018/0319645 A1 Nov. 8, 2018

(30) Foreign Application Priority Data

Nov. 6, 2015 (DE) ........................ 10 2015 014 280

(51) Int. Cl.
*B65G 17/18* (2006.01)
*B66F 17/00* (2006.01)
*B66F 9/02* (2006.01)

(52) U.S. Cl.
CPC ................ *B66F 17/00* (2013.01); *B66F 9/02* (2013.01)

(58) Field of Classification Search
CPC .. B65G 17/18; B66B 5/18; B66B 9/02; B66B 11/006; B66F 9/02; B66F 9/04; B66F 17/00

(Continued)

(56) References Cited

U.S. PATENT DOCUMENTS 2,266,915 A 12/1941 Steedman
4,987,922 A 1/1991 Andrepont et al.

(Continued)

FOREIGN PATENT DOCUMENTS

AT 500 280 11/2005
DE 39 30 222 3/1990

(Continued)

*Primary Examiner* — Joseph A Dillon, Jr.
(74) *Attorney, Agent, or Firm* — Schroeder Intellectual Property Law Group, LLC

(57) ABSTRACT

A lifting system for lifting and/or lowering loads having a lifting apparatus which is suitable for conveying loads along a lifting direction from a first transfer position into a second transfer position and along a lowering direction from the second transfer position to the first transfer position, and a conveyor apparatus which is suitable for taking on, at the first and/or the second transfer position, the loads conveyed by the lifting apparatus. The conveyor apparatus has at least one holding pendulum which is pivotable into a holding position, wherein the lifting apparatus has at least one holding receptacle for the holding pendulum, wherein the holding pendulum, in the holding position, can be placed in engagement with the holding receptacle, by a movement of the holding receptacle in the lowering direction, such that a movement of the lifting apparatus in the lowering direction is blocked, and/or the holding pendulum, in the holding position, can be placed in engagement with the holding receptacle, by a movement of the holding receptacle in the lifting direction, in such a way that a movement of the lifting apparatus in the lifting direction is blocked. The holding receptacle has a first guide track, wherein the first guide track is designed so as, during a movement of the holding receptacle along the lifting direction or the lowering direction, to move the holding pendulum into a first position in which the holding pendulum cannot be placed in engagement with the holding receptacle.

8 Claims, 7 Drawing Sheets

(58) Field of Classification Search
USPC .......... 198/463.3, 475.1, 800; 414/278, 281; 254/89 H, 89 R; 187/207, 208, 213, 363
See application file for complete search history.

(56) References Cited

U.S. PATENT DOCUMENTS

| | | | | |
|---|---|---|---|---|
| 5,234,079 | A * | 8/1993 | Nomura | B66B 11/0407 187/250 |
| 5,803,206 | A | 9/1998 | Halstead et al. | |
| 5,884,752 | A * | 3/1999 | Osborn | B66F 9/02 198/706 |
| 6,206,366 | B1 * | 3/2001 | Schmid | B65H 29/66 187/359 |
| 7,219,768 | B2 * | 5/2007 | Climenhaga | B66F 7/18 187/203 |
| 8,869,946 | B2 * | 10/2014 | Okada | B66B 5/22 187/350 |
| 2005/0095093 | A1 * | 5/2005 | Hansl | B66F 9/141 414/277 |
| 2007/0144991 | A1 | 6/2007 | Hansl et al. | |
| 2007/0170014 | A1 * | 7/2007 | Woronoff | B66B 5/16 187/414 |
| 2010/0108464 | A1 * | 5/2010 | Davi | B65G 1/127 198/347.1 |
| 2011/0095247 | A1 | 4/2011 | Adams | |
| 2011/0278517 | A1 | 11/2011 | Deuring et al. | |
| 2017/0121148 | A1 * | 5/2017 | Shiraishi | B66B 5/18 |
| 2018/0319628 | A1 * | 11/2018 | Shiraishi | B66B 5/22 |

FOREIGN PATENT DOCUMENTS

| | | |
|---|---|---|
| DE | 10 2008 024 051 | 11/2009 |
| EP | 2 314 536 | 4/2011 |
| JP | 2005-298155 | 10/2005 |

* cited by examiner

Figur 5E

LIFTING SYSTEM AND METHOD FOR LIFTING AND/OR LOWERING LOADS

RELATED APPLICATIONS

This application is a national phase of International Patent Application No. PCT/EP2016/076605 filed Nov. 3, 2016, which claims priority to German Patent Application No. 10 2015 014 280.1 filed Nov. 6, 2015, the contents of both of which are incorporated herein by reference.

BACKGROUND OF THE INVENTION

1. Field of the Invention

The invention relates to a lifting system for lifting and/or lowering loads, having a lifting apparatus, which is suitable for conveying loads along a lifting direction from a lower position into an upper position and along a lowering direction from the upper position to the lower position, and a conveying apparatus, which is suitable for receiving, at the lower and/or the upper position, the loads conveyed by the lifting apparatus.

2. Description of the Prior Art

Such lifting systems are known in the prior art. They are used in conveying technology for the vertical transportation of relatively large and often bulky loads, for example in the form of vertical lifters for the unaccompanied vertical conveying of objects. The lifting apparatus may have, for example, a vertically movable lifting carriage. The lifting carriage is used to move usually loads of large mass, for example, in a lifting cage or on a lifting platform, and therefore considerable forces can arise during accelerating operations, for example during start up, or during braking. Although these forces are usually dissipated by the carrying structures of the lifting apparatus, the elasticity of the lifting means, for example cables or chains, involved may mean that, following completion of the lifting operation, vibrations occur and/or a lowering or lifting movement of the lifting cage or of the lifting platform takes place. Such vertical movements taking place following completion of the lifting movement are undesirable and render more difficult a subsequent horizontal conveying operation, in which the loads located in the lifting cage or on the lifting platform discharge and are conveyed onward essentially horizontally.

The prior art discloses the practice of using pinning devices to prevent such undesirable movements from taking place. In this case, a motor-driven bolt is pushed into a corresponding aperture in order to prevent vertical movement. The disadvantage with this solution is the fact that such a pinning device requires a drive, and possibly even a power supply on the movable lifting carriage. In addition, the pinning device complicates the construction of the lifting system and therefore increases inherent susceptibility of the overall system to faults.

SUMMARY OF THE INVENTION

It is an object of the invention to specify a lifting system which is intended for lifting and/or lowering of loads and is straightforward, cost-effective and less susceptible to faults.

The object is achieved by a lifting system as claimed in independent claim 1. Further configurations according to the invention are specified in the respective dependent claims.

The lifting system according to the invention for lifting and/or lowering loads has a lifting apparatus, which is suitable for conveying loads along a lifting direction from a first transfer position into a second transfer position and along a lowering direction from the second transfer position to the first transfer position, and a conveying apparatus, which is suitable for receiving, at the first and/or the second transfer position, the loads conveyed by the lifting apparatus. The conveying apparatus has at least one retaining pendulum, which may be arranged in a stationary manner at the transfer position and which can be pivoted into a retaining position. The lifting apparatus has at least one retaining holder for the retaining pendulum. The retaining pendulum, in the retaining position, can be brought into engagement with the retaining holder, by a movement of the retaining holder in the lowering direction, such that a movement of the lifting apparatus in the lowering direction is blocked. The retaining holder has a first guide track. The first guide track is designed so that, when the retaining holder is moving along the lowering direction or the lifting direction, the guide track moves the retaining pendulum into a first position, in which the retaining pendulum cannot be brought into engagement with the retaining holder.

The lifting apparatus may be, for example, a scissors lift table or a lifting station. The first transfer position and the second transfer position need not be arranged directly vertically in relation to one another. Rather, the movement in the lifting direction or in the lowering direction may have a horizontal component, i.e. there is no need for the lifting apparatus and/or the lowering direction to run totally vertically. It is also possible to provide, between the first transfer position and the second transfer position, one or more intermediate positions, at which it is likewise possible to effect transfers to a conveying apparatus, intermediate stops without transfer of loads or pass bys without an intermediate stop.

It is possible for the retaining pendulum to have an upper end mounted in a rotatable manner at a suspension point. The lower, free end of the retaining pendulum, said end being located opposite the upper end, may be able to be pivoted about the upper end. The pivot axis or axis of rotation is then located at the suspension point.

The retaining pendulum and retaining holder constitute a straightforward and robust combination which manages without an additional drive for either of the elements. The provision of a first guide track on the retaining holder makes it possible for just a movement of the retaining holder, or of the lifting apparatus connected to the retaining holder, to move the retaining pendulum into a desired first position, in which the retaining holder and retaining pendulum are not in engagement. If the retaining pendulum is located in said first position, it is possible for the retaining holder and retaining pendulum to move relative to one another in the lowering direction and/or lifting apparatus. If, in contrast, the retaining pendulum is located in the retaining position, the retaining holder and retaining pendulum engage with one another during movement in the lowering direction, and therefore any further movement of the lifting apparatus in the lowering direction is blocked.

One embodiment makes provision for the retaining holder to have a holding contour, which is designed to hold the retaining pendulum such that a movement of the lifting apparatus in the lowering direction is blocked. The holding contour is preferably adapted to the shape of the retaining pendulum and may be, for example, of U-shaped design, it being possible for the opening of the U to be oriented vertically downward.

Provision may be made for the retaining pendulum to have a free end with a structure, for example a pin, a stub or a roller, projecting out of the movement plane of the retaining pendulum, said free end being designed to interact with the first guide track and with the holding contour. It is thus possible for the retaining pendulum to move past the retaining holder and for just the projecting structure to interact with the retaining holder. Such a structure can be fitted preferably at the lower, free end of the retaining pendulum. When the retaining pendulum is pivoted about its upper end, the structure, for example a roller, interacts with the first guide track and can roll, if appropriate, on the first guide track and the holding contour. This can improve the transmission of the forces to which the retaining pendulum is subjected by the retaining holder.

In the case of a preferred embodiment, the retaining holder may have a second guide track, which is designed so that, when the retaining holder is moving along the lowering direction or the lifting direction, the guide track brings the retaining pendulum into a second position, in which the retaining pendulum cannot be brought into engagement with the retaining holder. The provision of a first position and of a second position for the retaining pendulum, in which, in contrast to the retaining position, it is not possible for the retaining pendulum to engage with the retaining holder, simplifies travel past a lifting-apparatus position actually provided for a stop. It is thus possible, for example, for the first position to be provided for travel past in the lowering direction, whereas the second position may be provided for travel past in the lifting direction.

In the case of one embodiment, the retaining holder is fixed to the lifting apparatus.

In the case of a first alternative embodiment, the retaining position is located between the first and the second positions. Accordingly, it is possible for the first guide track, when the retaining holder is moving along for example the lowering direction, to cause the retaining pendulum to be deflected into the first position and for the second guide track, when the retaining holder is moving along for example the lifting apparatus, to cause the retaining pendulum to design into the second position.

In the case of a second alternative embodiment, the first and the second positions are located alongside the retaining position. It is possible here for example for the first position to be further away from the retaining position than the second position, and therefore, for example in the first position, for travel past a transfer position for example in the lowering direction to be possible and, in the second position, for travel past a transfer position for example in the lifting direction to be possible.

In the case of an advantageous development of the invention, provision may be made for the retaining holder to have at least one guiding-in member for the retaining pendulum, said member being designed to move the retaining pendulum in the direction of the retaining position, and/or wherein the retaining holder has a deflecting member for the retaining pendulum, said member being designed to move the retaining pendulum in the direction of the first and/or of the second position. This development has the advantage that, in the case of desirable or undesirable sluggishness of the retaining pendulum, the latter is subjected to positive guidance at least to some extent. Sluggishness here is intended to mean that the retaining pendulum remains in position solely under the influence of gravitational force or of other forces such as vibrations or the like.

On the one hand, the guiding-in member may be suitable for overcoming possible sluggishness of the retaining pendulum on a single occasion or on a permanent basis. On the other hand, the deflecting member together with the guiding-in member, with the guiding-in members and deflecting members being arranged in a suitable manner, can achieve full positive guidance of the retaining pendulum. It is, of course, possible to provide one or more guiding-in members and one or more deflecting members. In the case of full positive guidance, there is no need for the suspension point to be located above the free end of the retaining pendulum when the retaining pendulum is in the retaining position. Rather, for example in order to block a movement of the lifting apparatus in the lifting direction, it is possible for the free end of the retaining pendulum to be provided above the suspension point of the retaining pendulum. Correspondingly, in order to block a movement of the lifting apparatus in the lifting direction, it is possible for the retaining pendulum to engage in the retaining holder by a movement of the lifting apparatus in the lifting apparatus.

As an alternative, it is possible for a movement of the retaining pendulum for example from a first position into the retaining position, or from a second position into the retaining position, to take place solely by means of gravitational force.

The object is also achieved by a method for blocking and releasing a lifting apparatus of a lifting system, wherein the lifting system has a lifting apparatus, which is suitable for conveying loads along a lifting direction from a first transfer position into a second transfer position and along a lowering direction from the second transfer position to the first transfer position, and a conveying apparatus, which is suitable for receiving, at the first and/or the second position, the loads conveyed by the lifting apparatus, wherein the conveying apparatus has at least one retaining pendulum, which can be pivoted into a retaining position, wherein the lifting apparatus has at least one retaining holder for the retaining pendulum. The method has the following steps:

Moving the lifting apparatus in the lifting direction into a retaining-pendulum-holding position above the retaining position; moving the lifting apparatus in the lowering direction into the retaining position; moving the lifting apparatus into a retaining-pendulum-release position above the retaining position.

The movement of the lifting apparatus into the retaining-pendulum-holding position makes it possible for the retaining pendulum to pivot into a position in which the retaining pendulum can pass into engagement with the retaining holder. This engagement of the retaining pendulum in the retaining holder is realized by the movement of the lifting apparatus in the lowering direction. The movement of the lifting apparatus into the retaining-pendulum-release position makes it possible for the retaining pendulum to disengage from the retaining holder and thus to release, or enable, a movement of the lifting apparatus in the lowering direction again.

In the case of one configuration of the method, provision may be made for the movement of the lifting apparatus into the retaining-pendulum-holding position to cause the retaining pendulum to move out of a first position into a retaining position. The movement of the retaining pendulum here can be caused directly by the movement of the lifting apparatus or it can take place indirectly as a result of the pivoting region required for the movement of the retaining pendulum being freed.

Correspondingly, the movement of the lifting apparatus into a transfer position, for example by the lifting apparatus being lowered, can cause the retaining pendulum to be held in the retaining holder. Here too, the movement of the retaining pendulum can be caused directly by the movement of the lifting apparatus or can take place indirectly as a result of the pivoting region required for the movement of the retaining pendulum being freed. In the transfer position, the lifting apparatus is located on the same conveying level as the conveying apparatus, and therefore straightforward transfer of conveyed loads can take place.

In addition, in the case of one configuration of the method, provision may be made for the movement of the lifting apparatus into the release position to cause a movement of the retaining pendulum out of the retaining position into a second position.

The provision of a first position and of a second position alongside the retaining position can provide advantages executing travel past a transfer position, as has already been explained above for the lifting system according to the invention.

The retaining pendulum can be caused to move by means of a guide force brought about by at least one guide track of the retaining holder and/or by means of gravitational force and/or by means of a spring force.

BRIEF DESCRIPTION OF THE DRAWINGS

Exemplary embodiments of the invention will be explained in more detail hereinbelow with reference to the drawings, in which:

FIGS. 5A-5J show a second embodiment of a retaining-pendulum/retaining-pendulum holder combination according to the invention for a lifting apparatus for a lifting system, the combination being shown in different relative positions;

DESCRIPTION OF PREFERRED EXEMPLARY EMBODIMENTS

Figure 1:
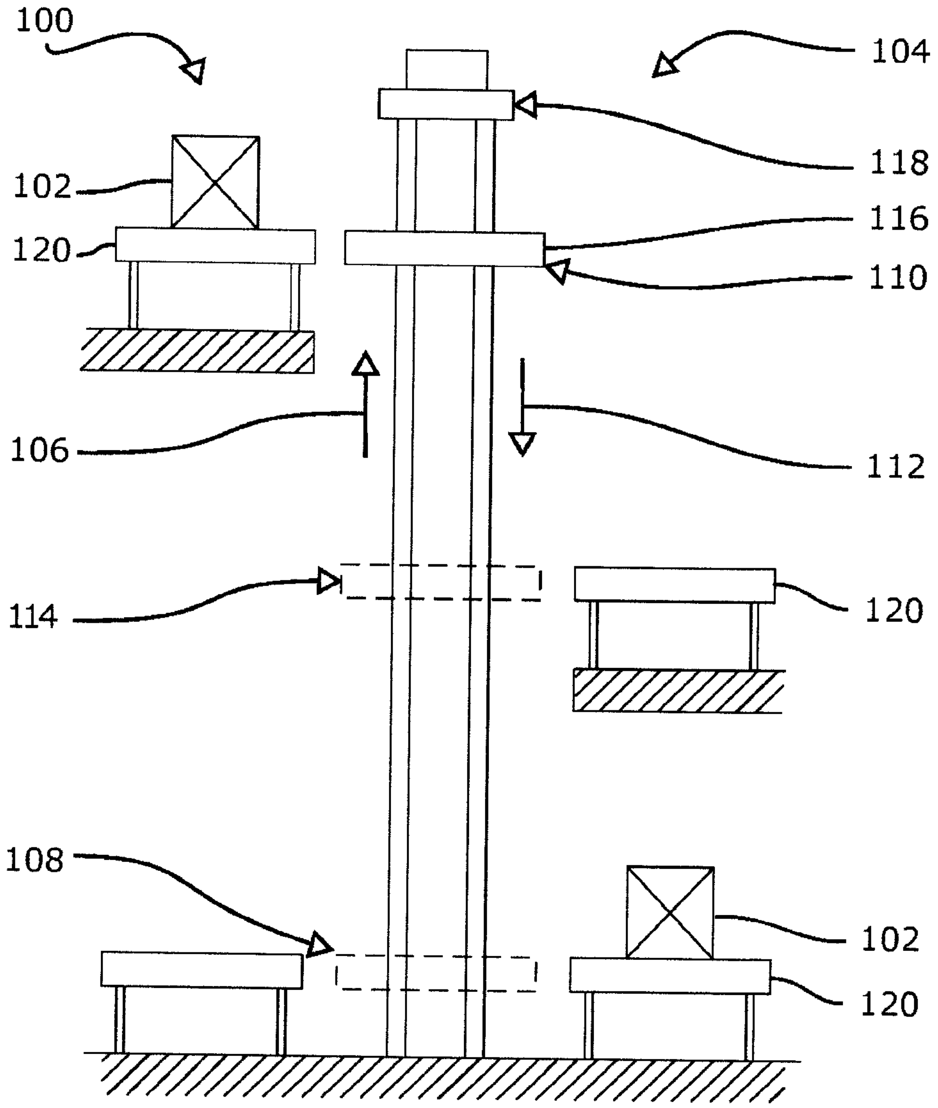
FIG. 1 shows a first embodiment of a lifting system according to the invention in the form of a lifting station.

FIG. 1 shows an embodiment of a lifting system in the form of a lifting station 100. The lifting station 100 serves for lifting and lowering loads 102 and has a lifting apparatus 104 for conveying loads 102 along a lifting direction 106 from a first transfer position 108 to a second transfer position 110 and, vice versa, along a lowering direction 112 from the second transfer position 110 to the first transfer position 108. It is also possible, in the case of the lifting station 100, to assume an intermediate transfer position 114, which is located between the second transfer position 110 and the first transfer position 108.

The lifting apparatus 104 has a lifting platform 116 (indicated schematically) and lifting means (not illustrated specifically) and also a suitable carrying and guide structure 118.

A respective conveying apparatus 120 is provided at the transfer positions 108, 110, 114, and said conveying apparatus can remove from the lifting apparatus 104 the loads 102 conveyed by the lifting apparatus and is designed for conveying the loads 102 onward essentially horizontally.

Figure 2A:
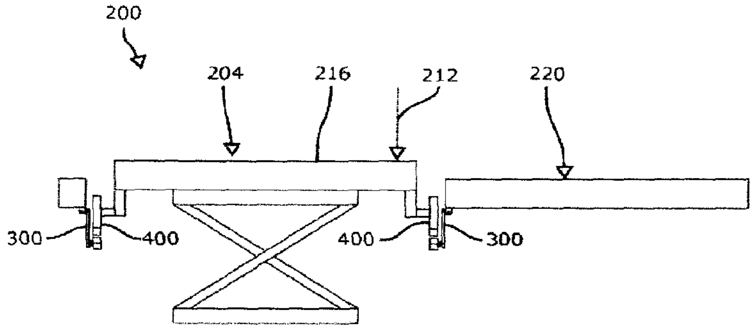
FIG. 2 shows a second embodiment of a lifting system according to the invention in the form of a scissors lift table.
Figure 2B:
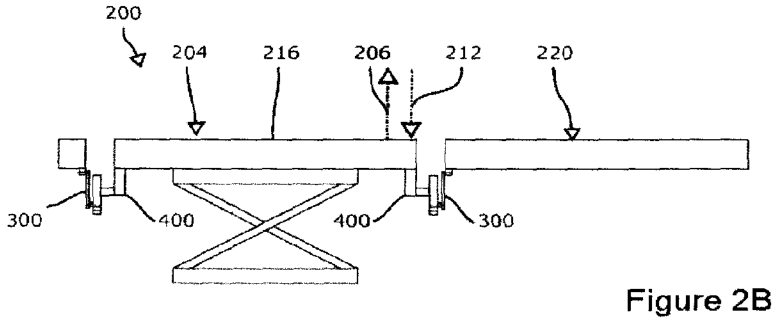
Figure 2C:
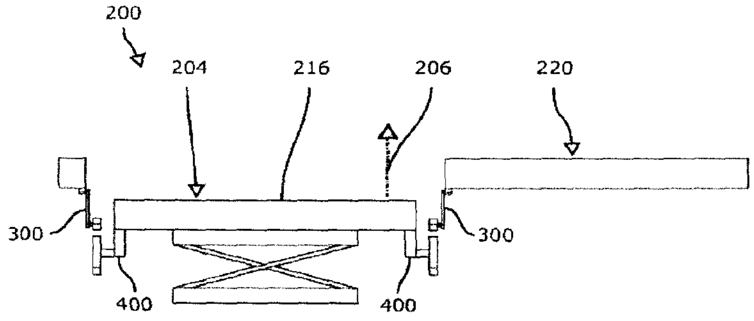

FIGS. 2A-2C show a lifting system 200 having a lifting apparatus designed in the form of a scissors lift table 204 and shown in different positions. A lifting platform 216 can be displaced in a lifting direction 206 or in a lowering direction 212. In FIG. 2B, the scissors lift table 204 is located in a transfer position, in which a load conveyed by means of the scissors lift table 204 can be transferred onto a conveying apparatus 220. In contrast, the position depicted in FIG. 2A constitutes an overtravel position and the position illustrated in FIG. 2C constitutes an undertravel position.

A retaining pendulum 300 is fastened on the conveying apparatus 220 and interacts with a retaining holder 400. This interaction between the retaining pendulum 300 and retaining holder 400 is explained in detail in FIGS. 3A-3J.

FIGS. 3A-3J show different positions of the retaining pendulum 300 and retaining holder 400 of a first embodiment of a retaining-pendulum/retaining-holder combination. The retaining pendulum 300 is fitted preferably on a conveying apparatus, for example the conveying apparatus 120, 220, but in any case in a fixed state in relation to a conveying apparatus. In this embodiment, the retraining pendulum 300 is of inherently rigid design and has an upper end 302, at which a suspension or bearing point 304 is located. The retaining pendulum 300 is mounted at the bearing point 304 such that it can be pivoted about an axis 306, which in the present exemplary embodiment runs perpendicularly to the drawing plane. A lower end 308 of the retaining pendulum 300, said lower end being located opposite the upper end 302, has provided on it a roller 310, which is mounted such that it can be rotated about an axis 312, which in the present exemplary embodiment extends perpendicularly to the drawing plane. As an alternative to the roller 310, it would also be possible to provide just a pin, a stub, a sliding block or some other suitable structure which interacts with the retaining holder 400 in the form described. The structure—in this case the roller 310—projects out of that plane of the retaining pendulum 300 within which pivoting or rotation of the retaining pendulum takes place. In this way, the retaining pendulum 300 can pivot past the retaining holder and it is only the structure—in this case the roller 310—which interacts with the retaining holder and is guided thereby. As an alternative to the rigid design of the retaining pendulum 300, it would also be possible for example for a chain or a cable of sufficiently robust dimensions to provide a connection, between the bearing point 304 and the lower end 308, which can be subjected merely to tensile loading.

The retaining holder 400 is connected to a lifting apparatus 104, 204, as is explained for example in the description relating to FIGS. 1 and 2A-2C, and moves along with the lifting apparatus 104, 204 in the lifting direction 106, 206 or in the lowering direction 112, 212. The lifting direction and lowering direction can run, for example, vertically. The retaining holder 400 has a first guide track 402, a second guide track 404 and a holding contour 406.

The first guide track 402 runs in a sloping manner in relation to the movement direction, for example the lifting direction 106, 206, and is arranged such that, when the retaining holder 400 is moving toward the retaining pendulum 300 in a first direction, for example in the lifting direction 106, 206, the first contact between the retaining holder 400 and the retaining pendulum 300 takes place on the first guide track 402.

The second guide track 404 likewise runs in a sloping manner in relation to the movement direction, for example the lowering direction 112, 212, and is arranged such that, when the retaining holder 400 is moving towards the retaining pendulum 300 in a second direction, for example in the lowering direction 112, 212, the first contact between the retaining holder 400 and the retaining pendulum 300 takes place on the second guide track 404.

In the embodiment shown, the holding contour 406 is arranged between the first guide track 402 and the second guide track 404 and is designed such that the retaining pendulum 300, in particular the lower end 308, or the roller 310 fitted at the lower end 308, can be held in the holding contour 406. The holding contour 406 is essentially U-shaped and, in the embodiment shown in FIGS. 3A-3J, is open in the downward direction, i.e. in the lowering direction 106, 206. The U-shaped holding contour 406 has two legs 408, 410, or leg contours, which are of unequal lengths. The first leg 408 is connected to the first guide track 402 via a first connecting contour 412, which runs in a movement direction of the retaining holder 400. The second leg 410 adjoins the second guide track 404 directly. The first leg 408 is of shorter configuration than the second leg 410, wherein the length of the legs 408, 410 relate to the extent of the same in the movement direction of the retaining holder 400. The second guide track 404 is connected to the first guide track 402 via a second connecting contour 414, which runs in the movement direction of the retaining holder 400.

The text below will explain a movement cycle over the course of which the retaining holder 400 travels toward the retaining pendulum 300 in a lifting direction 106, 206, passes into engagement with the retaining pendulum 300, that is to say to a certain extent is locked, is unlocked again and moves away from the retaining pendulum 300 in the lowering direction 112, 212.

Over the course of FIGS. 3A-3D, the retaining holder 400, on account of a lifting movement of the lifting apparatus 104, 204, is executing an upward movement, i.e. a movement in the lifting direction 106, 206. Whereas, in FIG. 3A, the retaining holder 400 is approaching the retaining pendulum 300, in FIG. 3B contact has already been made between the retaining holder 400, in particular the first guide track 402, and the retaining pendulum 300, in particular the roller 310 with the first guide track 402, and the retaining pendulum 300 has been pivoted out of a rest position toward a first position. The retaining pendulum 300 here rotates out of the rest position into the first position, which, in the illustration of FIGS. 3A-3C, corresponds to a rotation of the retaining pendulum 300 about its axis of rotation 306 clockwise and therefore in a first direction of rotation.

Figures 3A, 3B, 3C, 3D, 3E, 3F, 3G, 3H, 3I, 3J:
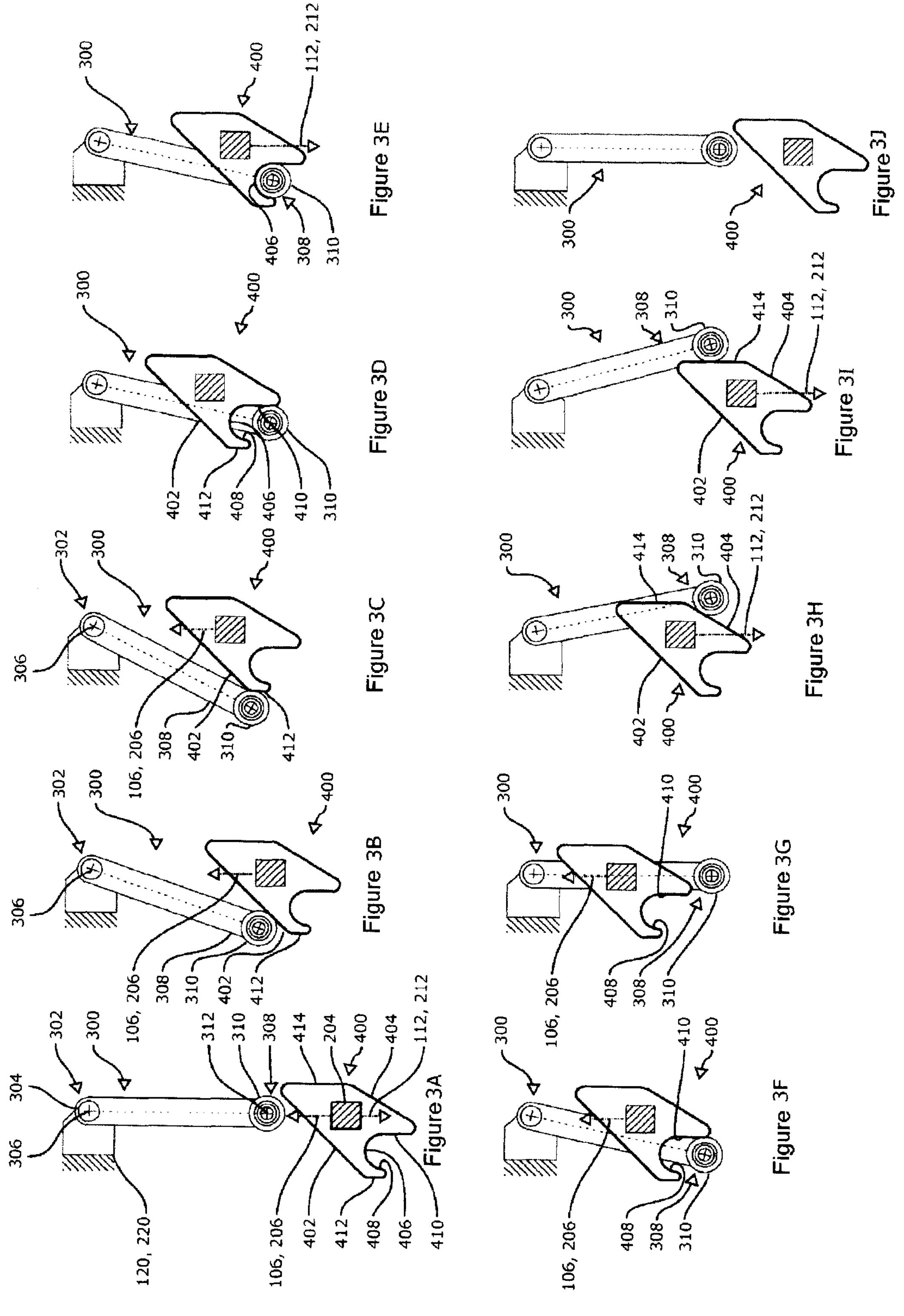
FIGS. 3A-3J show a first embodiment of a retaining-pendulum/retaining-holder combination according to the invention for a lifting apparatus for a lifting system, the combination being shown in different relative positions.

In FIG. 3C, the retaining pendulum 300 has assumed the first position. The first position of the retaining pendulum 300 is characterized in that, during a further upward movement of the retaining holder 400, the retaining pendulum 300 does not pivot any further, since the roller 310 has reached the end of the first guide track 402 and is now in contact with the connecting contour 412, which extends essentially in the movement direction. In other words: the retaining pendulum 300 has achieved maximum deflection in this direction of rotation and no longer obstructs any further upward movement of the retaining holder 400, it therefore also being the case that no further deflection or pivoting takes place.

In FIG. 3D, the roller 310 has passed by the lower end of the connecting contour 412 and is now in contact with the second leg 410. Once the connecting contour 412 has been left, the gravitational force acting on the retaining pendulum 300 has pivoted the retaining pendulum 300 back again from the maximum deflection in the first position of FIG. 3C, in the direction of the basic position of FIG. 3A, into the retaining position, albeit without reaching the basic position. The retaining pendulum 300 here is rotated about its axis of rotation 306 in a second direction of rotation—counter to the first direction of rotation. This convention—the first direction of rotation being counter to the second direction of rotation—will be used throughout here and in the following text.

At the changeover between FIGS. 3C and 3D, this corresponds to a counterclockwise rotation. The retaining position is thus located between the basic position and the first position. The retaining position is shown in FIG. 3D. When the retaining position of FIG. 3D is reached, the upward movement of the retaining holder 400 in a lifting direction 106, 206 ends. In this position, the lifting apparatus 104, 204 has overtravelled.

Between the position of the lifting apparatus 104, 204, or of the retaining holder 400, in FIG. 3D and the position shown in FIG. 3E, the lifting apparatus moves downward in the lowering direction 112, 212, and therefore, in the position shown in FIG. 3E, the first transfer position has been reached. The retaining pendulum 300 is in engagement with the retaining holder 400, in particular the lower end 308, the or the roller 310, is in engagement with the holding contour 406 of the retaining holder 400. On account of the roller 310 engaging in the holding contour 406, movement of the retaining holder 400 relative to the retaining pendulum 300, and therefore also movement of the lifting apparatus 104, 204 relative to the conveying apparatus 120, 220, is largely prevented. In particular, relative movements such as those which would result in the lifting apparatus 104, 204, or the retaining holder 400, lowering relative to the conveying apparatus 120, 220, or the retaining pendulum 300, are blocked.

For disengagement of the connection between the retaining pendulum 300 and retaining holder 400, the lifting apparatus 104, 204, and with it the retaining holder 400, executes a movement in the lifting direction 106, 206, see FIG. 3F and in this respect. The lifting apparatus 104, 204 thus overtravels again. In this case, the amount of overtravel here is greater than that illustrated in FIG. 3D, i.e. the position assumed by the retaining holder 400 in FIG. 3D is located above the position of the retaining holder 400 illustrated in FIG. 3G, as seen in the lifting direction 106, 206. This is due to the fact that the second leg 410, which in FIG. 3D serves as a stop for the retaining pendulum 300, in particular for the roller 310 at the lower end 308 the of the retaining pendulum 300, is longer than the first leg 408. In other words, the lifting direction 104, 204 overtravels to the extent where the retaining pendulum 300 can pivot past the second leg 410, into its basic position, in the second direction of rotation.

When the basic position is reached, the lifting apparatus 104, 204 can either continue moving and travel to a further transfer position in the lifting direction. As an alternative, as illustrated in FIGS. 3H-3J, the lifting apparatus 104, 204 can change movement direction and move in the lowering direction 112, 212. In this case, the second guide track 404 establishes contact with the lower end 308 of the retaining pendulum 300, in particular the roller 310, and, as a result of the continued movement in the lowering direction 112, 212, pivots the retaining pendulum 300 in the second direction of rotation, which runs counter to the pivoting movement which is caused by the first guide track 402. Accordingly, when it leaves the second guide track 404, the retaining pendulum 300 assumes a second position, which, in a manner corresponding to the first position, constitutes maximum deflection of the retaining pendulum 300. The first position and the second position therefore mark the maximum deflections of the retaining pendulum 300 in the respective direction of rotation which occur during operation of the lifting system 100, 200, and they delimit the possible pivoting region or region of rotation.

Once it has left the second guide track 404, the retaining pendulum 300 slides or rolls along the second connecting contour 414 (see FIG. 31) until it loses contact with the retaining holder 400 (see FIG. 3J). Thereafter, the retaining pendulum 300, driven by gravitational force, returns to its basic position, as is illustrated in FIG. 3J, and rotates in the first direction of rotation in the process.

The movement sequence illustrated in FIGS. 3A-3J corresponds to travel to a transfer position from beneath. For travel to the transfer position from above, first of all the movement sequence illustrated in FIGS. 3G-3J would have to be completed before the movement pattern shown in FIGS. 3A-3E could proceed.

Figure 4A:
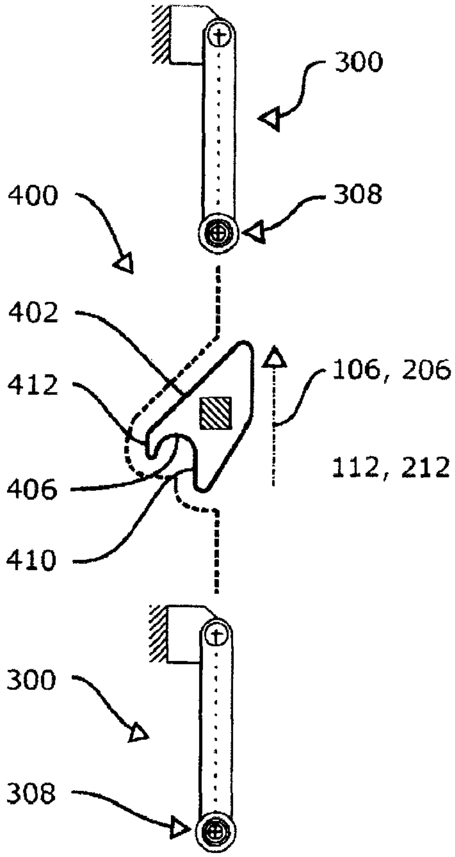
FIGS. 4A-4B show a depiction of a lifting and of a lowering operation of the retaining-pendulum/retaining-holder combination from FIGS. 3A-3J.
Figure 4B:
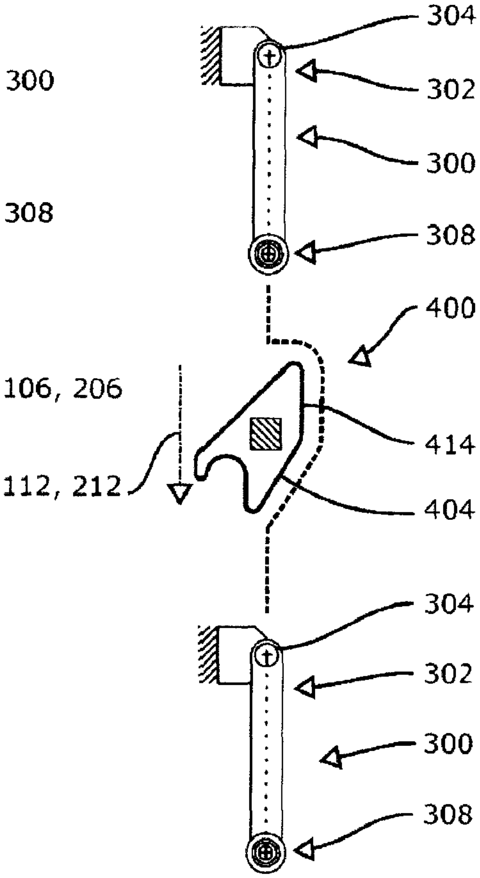

FIGS. 4A and 4B depict the path covered by the lower end 308 of the retaining pendulum 300 when the lifting apparatus 104, 204, or the retaining holder 400, travels past the conveying apparatus 120, 220, or the retaining pendulum 300, in the lifting direction 106, 206 (FIG. 4A) or in the lowering direction 112, 212 (FIG. 4B), without the retaining pendulum 300 passing into engagement with the retaining holder 400.

FIG. 4A illustrates the movement sequence of the free end 308 of the retaining pendulum 300 when the retaining holder 400 travels past the retaining pendulum 300 in the lifting direction 106, 206. In the first instance, the retaining pendulum 300 is located in the basic position. If the free end 308 establishes contact with the first guide track 402, the retaining pendulum 300 is deflected into the first position with a rotation in the first direction of rotation. While the free end 308 is in contact with the connecting contour 412, the pendulum 300 remains in the first position. Once the connecting contour 412 has been left, the retaining pendulum 300 pivots in the second direction of rotation into the retaining position, since the weight acting on the retaining pendulum 300 causes the retaining pendulum 300 to pivot in the direction of the basic position until the free end 308 comes into contact with the second leg 410. On account of the continued vertical movement in the lifting direction 106, the free end 308 of the retaining pendulum 300 slides along the second leg 410. Once contact between the retaining pendulum 300 and retaining holder 400 has terminated, the retaining pendulum 300 is released, and it therefore swings back into the basic position.

FIG. 4B depicts the movement sequence of the free ends 308 of the retaining pendulum 300 as the retaining holder 400 travels past in the lowering direction 112, 212. Starting from the basic position, the retaining holder 400 first of all passes by the upper end 302 of the retaining pendulum, in particular the bearing point 304, and reaches the lower end 308. There, the roller 310 establishes contact with the second guide track 404 of the retaining holder 400, as a result of which, as lowering movement of the retaining holder 400 continues, the retaining pendulum 300 pivots into the second position or is rotated counterclockwise, i.e. in the second direction of rotation, about the axis 306. Once the second guide track 404 has been left, the free end 308 slides along the second connecting contour 414, without any further rotation or pivoting of the retaining pendulum 300 taking place. Once the second connecting contour 414 has been left, the retaining pendulum 300 is subject only to gravitational force and returns to its basic position.

No latching takes place between the retaining holder 400 and retaining pendulum 300 in the movement sequences illustrated.

FIGS. 5A-5J show different positions of the retaining pendulum 300 and retaining holder 400 of a second embodiment of a retaining pendulum/retaining-holder combination. In contrast to the first embodiment, which is illustrated in FIGS. 3A-3J, the retaining holder 400 is supplemented by guiding-in structures. These guiding-in structures, depending on the configuration, provide for partial or full positive guidance of the retaining pendulum 300. This has the advantage that it is possible to assist the weight-induced restoring movement of the retaining pendulum 300. In the case of full positive guidance, it is possible to dispense with a weight-induced restoring movement. This may be of interest, in particular, when the design of the retaining-pendulum/retaining-holder combination gives rise to the expectation that for example dirt or the like will render the retaining pendulum sluggish to the extent where an automatic restoring movement of the retaining pendulum is improbable. The actual retaining holder 400 and the retaining pendulum 300 are of identical design to the first embodiment. Accordingly, the same reference signs are used and the corresponding features will not be explained anew.

The following text will now use the description of FIGS. 5A-5J to discuss the differences in the movement sequence from that of FIGS. 3A-3J at the points at which these differences occur.

In contrast to the embodiment of FIGS. 3A-3J, the retaining pendulum 300 shown in FIG. 5A can be moved back again into a basic position not just under the action of weight. Rather, for a restoring movement into the basic position, the restoring force applied has to be one which is greater than the weight-induced force. In addition, alongside the features already described, the retaining holder 400 has guiding-in members 416, 418, 420 and 422. All the guiding-in members 416-422 are fixed to the retaining holder 400 and move along therewith when the lifting apparatus 104, 204 is moving in the lifting direction 106, 206 or in the lowering direction 112, 212.

Figures 5A, 5B, 5C, 5D, 5F, 5G, 5H, 5I, 5J:
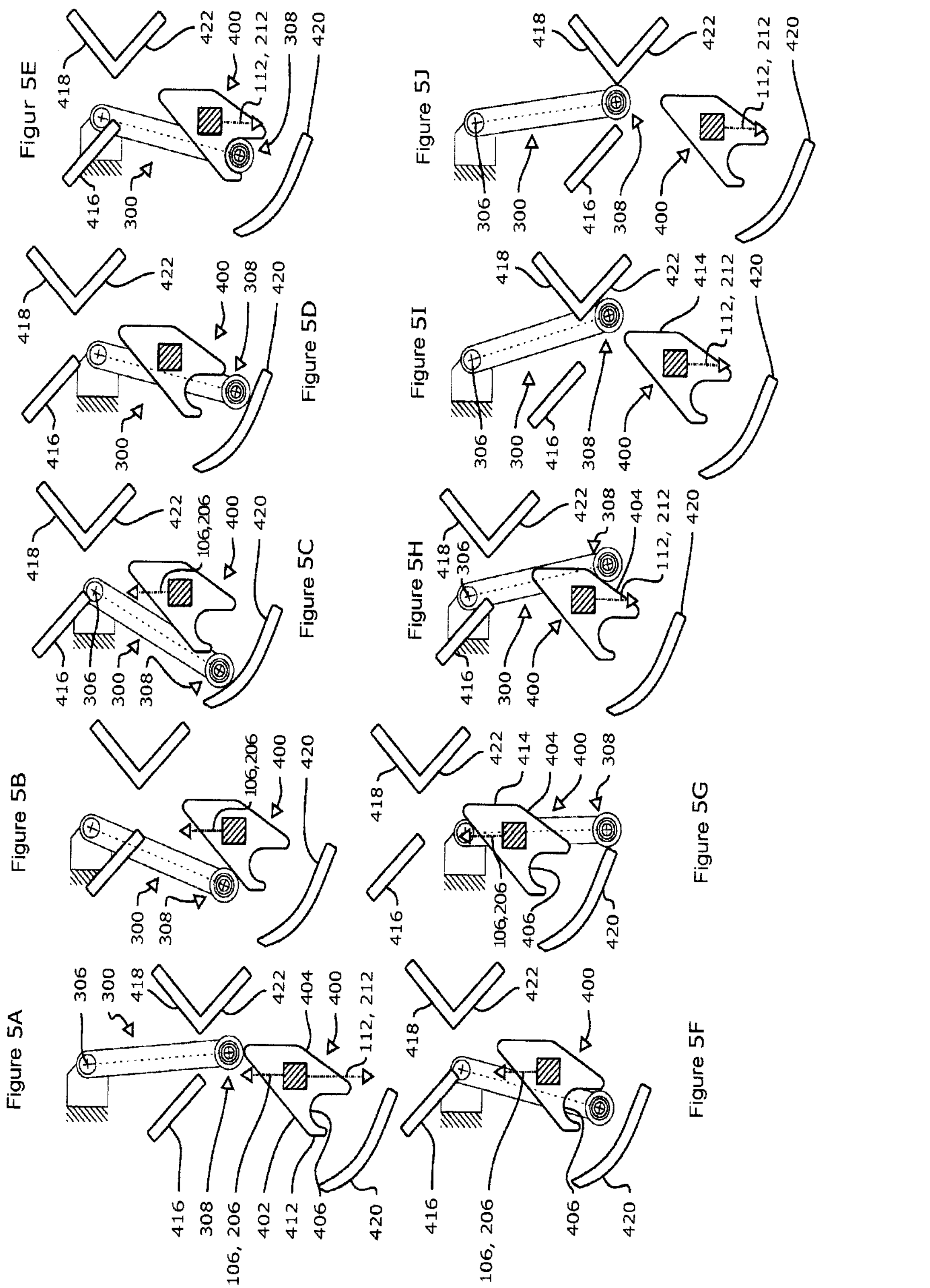

The guiding-in members 416, 418 are located above the retaining holder 400 and serve to restore the retaining pendulum 300 with positive guidance into the basic position, which is shown in FIG. 5A, during a lifting movement of the retaining holder 400.

The first guiding-in member 416 here is arranged in a sloping manner in relation to the movement direction of the retaining holder 400 and, upon contact with the lower, free end 308 of the retaining pendulum 300 during a lifting movement of the retaining holder 400 in the lifting direction 106, 206, results in the retaining pendulum 300 pivoting in the direction of the basic position, which is shown in FIG. 5A. According to the illustration of FIG. 5A, a rotary movement about the axis of rotation 306 counterclockwise, i.e. in the second direction of rotation, takes place here.

The second guiding-in means 418 is likewise arranged in a sloping manner in relation to the movement direction of the retaining holder 400 and, during a lifting movement of the retaining holder 400 in a lifting direction 106, 206, likewise results in the retaining pendulum 300 being restored into the basic position. However, the slope of the second guiding-in member is arranged such that, according to FIG. 5A, a rotary movement clockwise, i.e. in the first direction of rotation, takes place here.

During the movement cycle described in FIGS. 5A-5J, it would, in fact, be possible to do without the first guiding-in member 416 and the second guiding-in member 418, since the movements of the retaining pendulum 300 which are caused by the retaining holder 400 should not give rise to the retaining pendulum 300 assuming any position which renders the guiding-in members 416, 418 necessary. However, irrespective of the movements induced by the retaining holder 400, it is possible for the retaining pendulum 300 to be rotated, for example during maintenance operations or as a result of unforeseen influences, in such a way as to render a restoring movement using one of the guiding-in members 416, 418 necessary.

Irrespective of the capability of the retaining pendulum 300 to rotate under its weight, it is also possible for the guiding-in members 416, 418 already described to be used, in the configuration shown, in the first embodiment of FIGS. 3A-3J.

In this case, the guiding-in members 416, 418 constitute a safety feature which orients the retaining pendulum 300 prior to the first contact at the lower end 308 of the retaining pendulum 300 with the retaining holder 400, in particular with the first guide track 402.

A third guiding-in member 420 is arranged at least to some extent beneath the retaining holder 400 and, just like the first guiding-in member 416 upon contact with the lower end 308 of the retaining pendulum 300 during a movement of the retaining holder 400 in the lifting direction 106, 206, causes the retaining pendulum 300 to rotate counterclockwise, that is to say in the first direction of rotation, in the direction of the basic position. There is not necessarily any need here for the third guiding-in member 420 to be designed so as to rotate the rotating pendulum 300 all the way back into the basic position. Rather, the third guiding-in member 420 can be used to rotate the retaining pendulum 300, on the one hand, into the retaining position and, on the other hand, into a position where contact with the second guide track 404 takes place when movement of the lifting apparatus 104, 204 reverses.

In the embodiment shown, a fourth guiding-in member 422 is combined with the second guiding-in member 418 and is oriented at least to some extent parallel to the first and the second guiding-in members 416, 420. Upon contact with the lower end 308 of the retaining pendulum 300 during a lowering movement of the retaining holder 400 in the lowering direction 112, 212, the fourth guiding-in member 422 causes the retaining pendulum 300 to be restored into the basic position, which is shown in FIG. 5A. During this restoring movement, the retaining pendulum 300, or the free end 308 thereof, rotates about the axis of rotation 306 clockwise, in the first direction of rotation, according to the illustration of FIGS. 5A-5J. This fourth guiding-in member 422 could likewise be used in the case of the first embodiment of FIGS. 3A-3J. A fifth guiding-in member (not depicted) corresponding to the fourth guiding-in member 422 could be arranged, in a manner analogous to the fourth guiding-in member 422, on the first guiding-in member 416, or could be combined therewith, to give an X-shaped structure overall.

In FIG. 5A, the retaining pendulum 300 is located in a basic position which differs from that of FIG. 3A. The reason for this lies in the different way of restoring the retaining pendulum 300. This situation will become clear at the end of the description of FIG. 5J.

The following text will now describe a movement cycle over the course of which the retaining pendulum 300 passes the engagement with the retaining holder 400 and is unlocked again.

In FIGS. 5A-5D, a lifting movement of the retaining holder 400, brought about by a lifting movement of the lifting apparatus 104, 204, takes place along the lifting direction 106, 206. In FIG. 5A, the free end 308 of the retaining pendulum 300 has already passed by the guiding-in members 416, 418, as a result of which—if necessary—the retaining pendulum 300 has rotated into its basic position. Thereafter, the the free end 308 of the retaining pendulum 300 comes into contact with the first guide track 402 of the retaining holder 400. As already explained in relation to FIGS. 3A-3C, the movement of the retaining holder 400 causes the retaining pendulum 300 to rotate into the first position—according to FIGS. 5B-5D, clockwise in the first direction of rotation.

Once this first position has been reached and once the connecting contour 412 has been left, the free end 308 of the retaining pendulum 300 comes into contact with the third guiding-in member 420. This is illustrated in FIG. 5C. As the holding contour 400 continues to move in the lifting direction 106, 206, in the case of the first exemplary embodiment of FIGS. 3C-3D a restoring movement of the retaining pendulum 300 takes place solely under gravitational force. In the case of the exemplary embodiment of FIGS. 5A-5J described here, in contrast, the restoring movement of the retaining pendulum 300 takes place as a result of the third guiding-in member 420. The latter, as already explained above, is arranged such that, upon contact with the free end 308 of the retaining pendulum 300, the retaining pendulum 300 is subjected to a force which results in the retaining pendulum 300 assuming the retaining position, that is to say results in the free end 308 rotating about the axis of rotation 306 counterclockwise in the second direction of rotation, as depicted in FIGS. 5C-5D.

When the retaining position is reached—see FIG. 5D—the movement of the retaining holder 400 in the lifting direction 106, 206 ends. A movement of the retaining holder 400 in the lowering direction 112, 212 is then initiated and the free end 308 and the holding contour 406 pass into engagement, as already explained in relation to FIG. 3E. This situation is illustrated in FIG. 5E.

In order to unlock the retaining pendulum 300 and retaining holder 400, a movement in the lifting direction 106, 206 of the retaining holder 400 is initiated anew. In this case, the free end 308 of the retaining pendulum 300 comes into contact anew with the third guiding-in member 420, which in turn causes the free end 308 of the retaining pendulum 300 to rotate about the axis of rotation 306 counterclockwise in the second direction of rotation. This is shown in FIGS. 5F and 5G. The retaining pendulum 300 is rotated here to the extent where the free end 308 of the retaining pendulum 300 and the holding contour 406 of the retaining holder 400 are no longer in alignment with one another in the movement direction; rather, they are offset in relation to one another. This situation is illustrated in FIG. 5G. It is then possible for the upward movement of the retaining holder 400 in the lifting direction 106, 206, said upward movement being necessary for unlocking purposes, to end. If onward movement of the lifting apparatus 104, 204 in the lifting direction 106, 206 is envisaged, this movement can be continued. If, in contrast, the lifting apparatus 104, 204 is instead intended to be moved onward in the lowering direction 112, 212, it is then likewise possible for this to take place or to be continued. In this case, the free end 308 of the retaining pendulum 300, as already described with the first exemplary embodiment, is guided by the second guide track 404 and the connecting contour 414 and the retaining pendulum 300 is moved into the second position by rotation about the axis of rotation 306 counterclockwise in the second direction of rotation—as illustrated in FIGS. 5H and 5I.

When the downward movement of the retaining holder 400 in the lowering direction 112, 212 is continued—as shown in FIGS. 5E-5J—the fourth guiding-in member 422 causes the retaining pendulum 300 to be restored anew upon contact of the free end 308 thereof with the fourth guiding-in member 422. A rotation of the retaining pendulum 300 about its axis of rotation 306 clockwise in the first direction of rotation takes place here. When the downward movement of the retaining holder 400 in the lowering direction 112 is continued further, the retaining pendulum 300 remains in this position.

FIGS. 6A-6J show different positions of a retaining pendulum 300 and positions of a third embodiment of a retaining holder 500 in a retaining-pendulum/retaining-holder combination.

Features of the retaining holder 500 which are the same as, or comparable to, those of the embodiment of the retaining holder 400 of FIGS. 3A-3J and 5A-5J are designated by reference signs to which 100 has been added.

The arrangement of the retaining pendulum 300 and retaining holder 500 corresponds, in principle, to the first and the second embodiments of FIGS. 3A-3J and 5A-5J. Accordingly, the retaining pendulum 300 is fastened in a rotatable manner on a conveying apparatus, for example the conveying apparatus 120, 220. In the case of this third embodiment, as already the case for the first embodiment, provision is made for the retaining pendulum 300 to be restored into its basic position exclusively under its own weight. In order to assist the restoring movement of the retaining pendulum 300, it is possible to provide guiding-in members, comparable to the structures 416-422 of the second embodiment, as explained in the description relating to FIGS. 5A-5J.

The retaining holder 500, in a manner comparable to the first embodiment, as explained in the description relating to FIGS. 3A-3J, is connected to a lifting apparatus 104, 204 and moves along therewith in the lifting direction 106, 206 or lowering direction 112, 212. The retaining holder 500 has a guide track 502, a holding contour 506 and connecting contours 512, 514, which connect the guide track 502 and the holding contour 506.

Figures 6A, 6B, 6C, 6D, 6E, 6F, 6G, 6H, 6I, 6J:
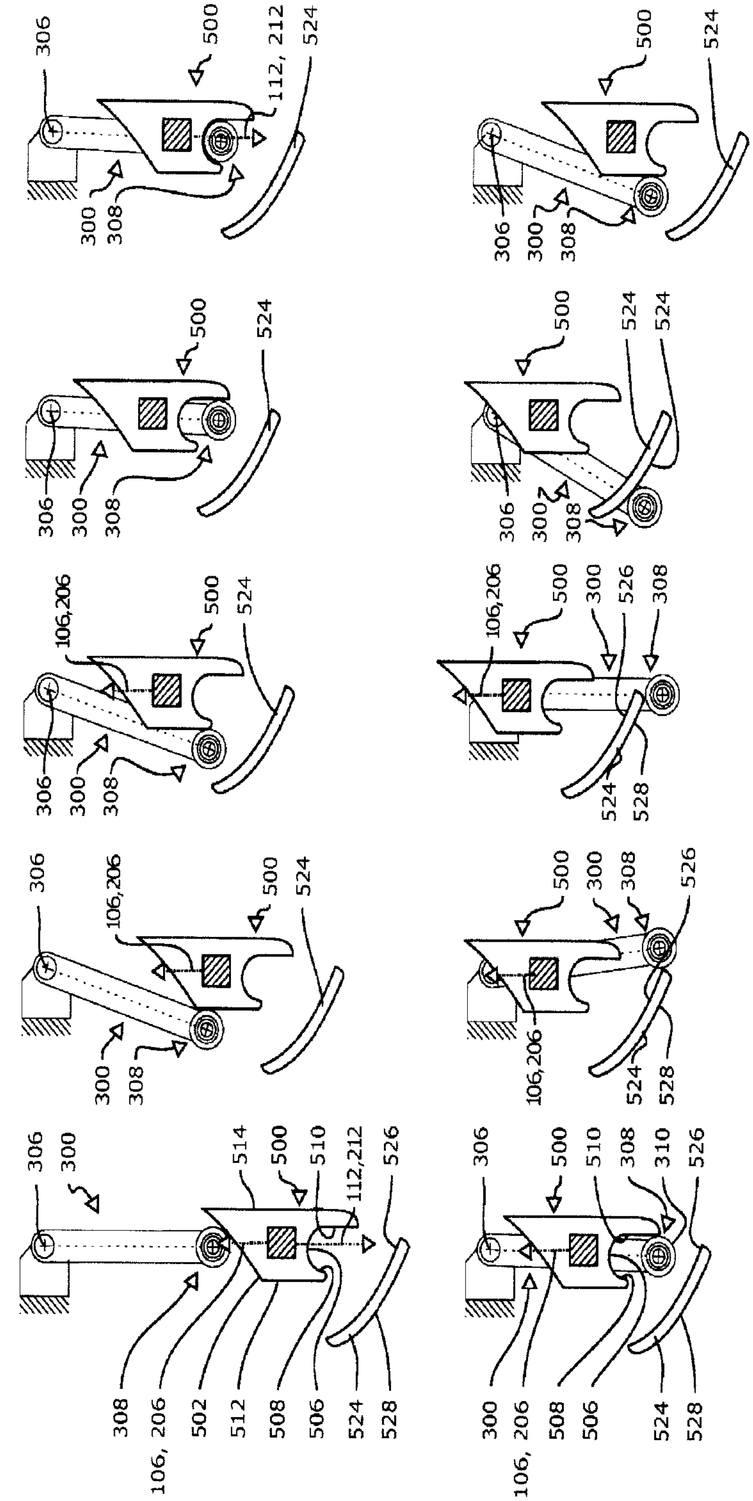
FIGS. 6A-6J show a third embodiment of a retaining-pendulum/retaining-holder combination for a lifting apparatus for a lifting system, the combination being shown in different relative positions.

The first guide track 502 runs in a sloping manner in relation to the movement direction of the retaining holder 500 and is configured such that, when the retaining holder 500 moves in the lowering direction 112, 212, the retaining pendulum 300 is pivoted into its first position—in the illustration of FIGS. 6A and 6B, this corresponds to the retaining pendulum 300 rotating about its axis of rotation 306 clockwise, i.e. in the first direction of rotation. During such a movement, the retaining pendulum 300 moves away from its basic position, which is shown in FIG. 6A and in which the retaining pendulum 300 is oriented essentially vertically.

In contrast to the first embodiment, the retaining holder 500 itself does not have any contour comparable to the second guide track 404 since, in this third embodiment, it is exclusively movements on one side of the retaining holder 500 which are envisaged for the retaining pendulum 300. Instead of a second guide track 404, a guiding-in structure 524 is provided. The guiding-in structure 524 has a guiding-in track 526 and a deflecting track 528. Upon contact between the free end 308 of the retaining pendulum 300 and the guiding-in track 524 during an upward movement of the retaining holder 500 in the lifting direction 106, 206, the guiding-in track 524 results in the retaining pendulum 300 moving in the direction of its basic position. This corresponds, in the depiction of FIGS. 6F and 6G, to the retaining pendulum 300 rotating about its axis of rotation 306 counterclockwise in the second direction of rotation. Upon contact between the roller 310 of the retaining pendulum 300 and the deflecting track 528 during a lowering movement of the retaining holder 500 in the lowering direction 112, 212, the deflecting track 528 results in the retaining pendulum 300 moving away from its basic position. This corresponds, in the depiction of FIGS. 6A-6J, to the retaining pendulum 300 rotating about its axis of rotation 306 clockwise in the first direction of rotation. In the embodiment shown in FIGS. 6A-6J, the guiding-in track 524 and the deflecting track 528 run essentially parallel. However, this is not imperative. The guiding-in track 524 and deflecting track 528 may each follow a separately optimized course.

The following text will now use FIGS. 6A-6J to explain the differences in the movement cycle in relation to the movement cycle illustrated in FIGS. 3A-3J, said differences arising from the retaining holder 500 and the guiding-in structure 524 being configured differently.

The movement sequence illustrated in FIGS. 6A-6E involves latching of the retaining pendulum 300 with the retaining holder 500, in particular of the free end 308 of the retaining pendulum 300 with the holding contour 506 of the retaining holder 500. The movements of the retaining holder 500, or of the lifting apparatus 104, 204, which are executed here correspond, in principle, to the movements which are executed in the case of the first embodiment of FIGS. 3A-3J. In FIGS. 6B and 6C, the retaining pendulum 300 is located in a first position. In contrast to the first embodiment, however, in the latching position shown in FIG. 6E, the retaining pendulum 300 is located essentially in its basic position. This has the advantage that forces which are transmitted to the retaining pendulum 300 by the retaining holder 500, or to the conveying apparatus 120, 220 indirectly by the lifting apparatus 104, 204, can be absorbed to better effect. Moreover, it is not absolutely necessary in this case for the second leg 510 of the holding contour 506 to be longer than the first leg 508, as long as the free pendulum movement of the retaining pendulum 300 is damped.

FIGS. 6F-6H illustrate an unlatching movement of the retaining pendulum 300 from the retaining holder 500. Between FIGS. 6F and 6H, the retaining holder 500, or the lifting apparatus 104, 204, moves in the lifting direction 106, 206. As a result, the free end 308 of the retaining pendulum 300, for example the roller 310 located at said free end 308, comes into contact with the guiding-in structure 524, in particular with the guiding-in track 526. The guiding-in track 526 moves the retaining pendulum 300 out of its basic position into a second position, which it has reached in FIG. 6G. During the continued upward movement of the retaining holder 500 once the basic position has been reached, the retaining pendulum 300 moves once again into its basic position, which it maintains during continuing upward movement of the retaining holder 500, or of the lifting apparatus 104, 204.

FIGS. 6I and 6J show the movement sequence of the retaining pendulum 300 as the retaining holder 500 travels past the conveying apparatus 104, 204 in the lowering direction 112, 212. In the first instance, starting from the basic position—as shown in FIG. 6H—the retaining pendulum 300, or the free end 308 thereof, comes into contact with the guiding-in structure 524. The deflecting track 528, which is located on the guiding-in structure 524, guides the free end 308 and thus causes the retaining pendulum 300 to move out of its basic position into a third position, which it assumes over the course of the downward movement of the retaining holder 500 just prior to loss of contact between the free end 308 of the retaining pendulum 300 and the guiding-in structure 524. The pendulum 308 here, according to the illustration of FIGS. 6A-6J, performs a rotary movement about its axis of rotation 306 clockwise in the first direction of rotation. Thereafter, the weight acting on the retaining pendulum 300 causes the retaining pendulum 300 to be restored into the first position, which is illustrated in FIG. 6J and corresponds to the position of FIG. 6B. In this case, in turn, the retaining pendulum 300 is rotated about its axis of rotation 306 counterclockwise in the second direction of rotation, according to FIGS. 6J and 6A. Overall, the third embodiment of the retaining holder 500 provides for the retaining pendulum 300 to be guided on just one side of the retaining holder 500 and, in particular, for the retaining holder 500 and retaining pendulum 300 to be latched in a largely vertical rest position of the retaining pendulum 300, which provides for an optimized flow of forces from the lifting apparatus 104, 204 to the conveying apparatus 120, 220.

FIGS. 7A-7J show a further, fourth embodiment of a retaining-pendulum/retaining-holder combination. Alongside the retaining pendulum 300 already described in the preceding embodiments, this combination has an alternatively designed retaining holder 600. Features of the retaining holder 600 which are the same as, or comparable to, those of the previously described first, second and third embodiments are designated by reference signs to which 100 or 200 has been added. During the movement sequence of the third embodiment illustrated in FIGS. 6A-6J, the retaining pendulum 300 is restored under its own weight. In contrast to this, the fourth embodiment, which is illustrated in FIGS. 7A-7J, is subjected exclusively to positive guidance, i.e. the retaining pendulum 300 is moved exclusively by means of guide tracks or guide contours. A weight-induced restoring movement is not envisaged.

The fourth embodiment of FIGS. 7A-7J has a retaining holder 600 which, in a manner comparable to the retaining holder 500 of FIGS. 6A-6J, provides for guidance of the retaining pendulum 300 on just one side of the movement directions 106, 206, 112, 212 and, correspondingly, on just one side of the retaining holder 600. The retaining holder 600 itself has no first guide track 402, which could cause the retaining pendulum 300 to rotate clockwise in the first direction of rotation about the axis of rotation 306. A connecting contour 612 is provided, and this runs essentially parallel to the movement direction of the retaining holder 600. In the same way as for the previously described embodiments, a holding contour 606 is present, and this interacts with the free end 308 of the retaining pendulum 300 so as to provide for a supporting or latching action between the retaining pendulum 300 and retaining holder 600.

Alongside the actual retaining holder 600, two guiding-in structures 630, 632 are present. The first guiding-in structure 630 performs its function during a downward movement of the retaining holder 600 in the lowering direction 112, 212, in order to rotate the retaining pendulum about its axis of rotation 306 counterclockwise, in the second direction of rotation, once again into the basic position, according to the illustration of FIGS. 7I-7J. For this purpose, the guiding-in structure 630 has a guiding-in track 631, which is oriented in a sloping manner in relation to the movement direction of the retaining holder 600, or of the lifting apparatus 104, 204. The second guiding-in structure 632 performs a two-fold function: a first guiding-in track 634 of the second guiding-in structure 632 is arranged in a sloping manner in relation to the movement direction of the retaining holder 600, as it moves in the lowering direction 112, 212, such that the retaining pendulum 300 rotates about its axis of rotation 306 away from the basic position into a latching or supporting position. This rotation corresponds, in FIGS. 7B-7D, to a rotation of the retaining pendulum 300 counterclockwise in the second direction of rotation. A second guiding-in track 636 of the guiding-in structure 632 is arranged in a sloping manner in relation to the movement direction of the retaining holder 600, when the retaining holder is moving in the lowering direction 112, 212, such that, upon contact of the free, movable end 308 of the retaining pendulum 300 with the second guiding-in track 636 of the guiding-in structure 632, the retaining pendulum is rotated clockwise in the first direction of rotation away from the supporting or latching position. As the lowering movement of the retaining holder 600 continues, the free end of the retaining pendulum comes into contact with the guiding-in track 631 of the first guiding-in structure 630.

A detailed description of the movement cycle will not be given here on account of the great similarities. The following text will deal predominantly with the differences in the movement sequence of the retaining pendulum 300 and retaining holder 600.

Figures 7A, 7B, 7C, 7D, 7E, 7F, 7G, 7H, 7I, 7J:
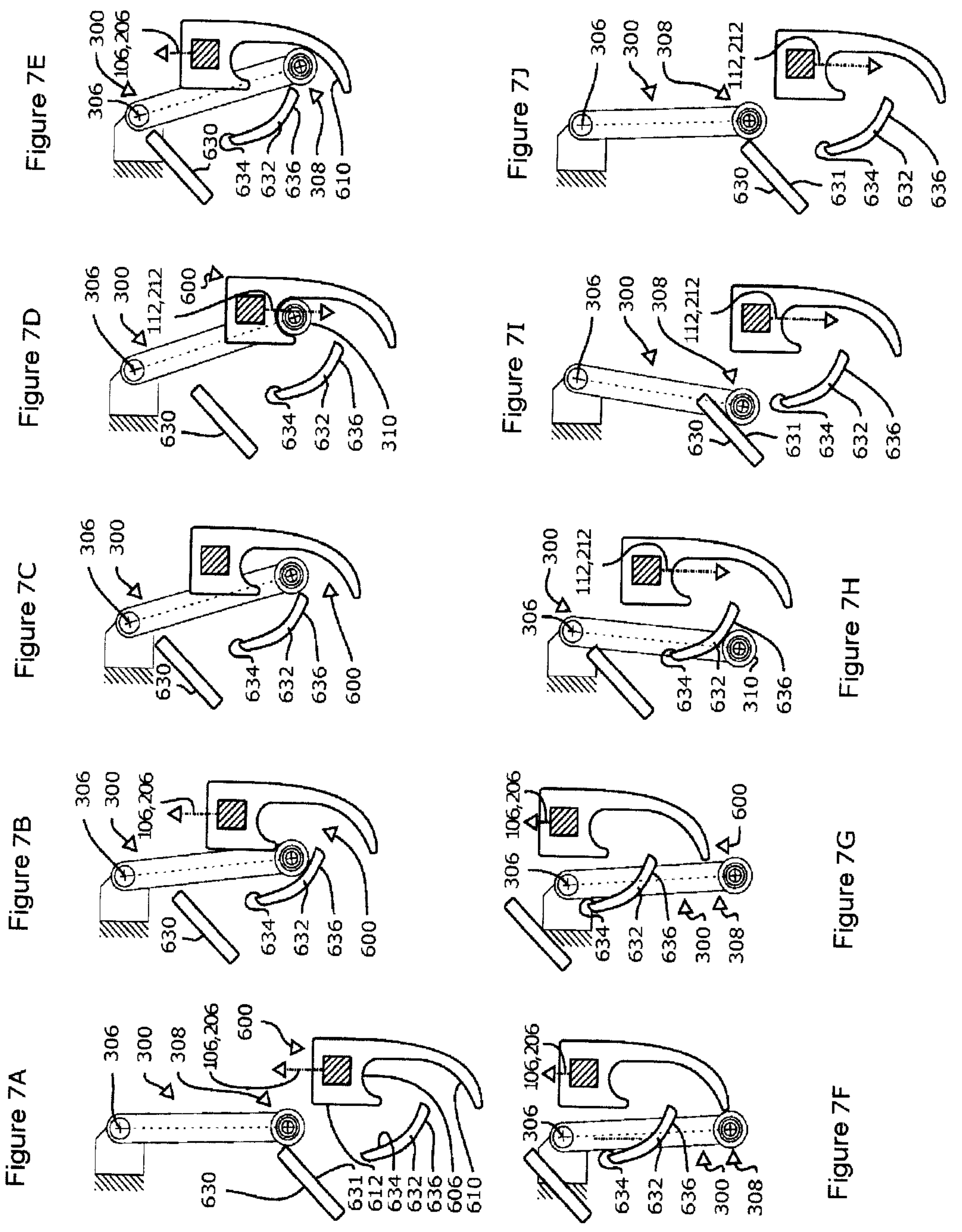
FIGS. 7A-7J show a fourth embodiment of a lifting-pendulum/lifting-holder combination for a lifting apparatus for a lifting system, the combination being shown in different relative positions.

FIG. 7A shows the starting or basic position of the retaining pendulum 300. In the basic position of the fourth embodiment, the retaining pendulum 300 is not located precisely vertically. However, this is merely arbitrary. It would also be possible to select a precisely vertical orientation or some other basic position, in which the retaining pendulum 300 encloses a relatively large angle, or an angle bearing a different sign, with the vertical. Proceeding from FIG. 7A to FIG. 7C, the retaining holder 600 performs an upward movement, brought about by a lifting movement along a lifting direction 106, 206 of the lifting apparatus 104, 204, to which the retaining holder 600 is fixed. During this movement, the retaining pendulum 300 is brought, by the guiding-in structure 632, into its latching or supporting position, which it assumes in FIG. 7C. Between FIGS. 7C and 7D, the retaining holder 600 has executed a movement in the lowering direction 112, 212, and therefore the free end 308, for example a roller 310 fitted thereon or a stub or pin located there, is in engagement with the holding contour 606 of the retaining holder.

FIGS. 7E and 7F illustrate an unlocking or release movement, during which the retaining holder is executing an upward movement in the lifting direction 106, 206. During this movement, the second leg 610 of the holding contour 606, the second leg in this fourth embodiment being considerably longer than the second leg 410 of the first embodiment, guides the free end 306 and rotates the retaining pendulum 300 in the direction of the basic position, which, in the illustration of FIGS. 7E-7F, corresponds to the retaining pendulum 300 rotating clockwise in the first direction of rotation. When that position of the retaining pendulum 300 and of the retaining holder 600 which is illustrated in FIG. 7F is reached, a movement of the retaining holder 600 in the lifting direction 106, 206 can be continued without the retaining pendulum 300 being rotated any further. This is depicted in FIG. 7G.

If, in contrast, the movement direction is reversed and the retaining holder 600 moves instead in the lowering direction 112, 212, then the free end 308 of the retaining pendulum 300 comes into contact with the second guiding-in track 636. This is illustrated in FIGS. 7H-7J. The guiding-in track 636 causes the retaining pendulum 300 to rotate away from the latching or supporting position, which, in FIGS. 7H-7I, corresponds to the retaining pendulum 300 rotating clockwise in the first direction of rotation. This rotation would not be necessary per se, since the retaining pendulum 300 would move past the retaining holder 600 without latching with the holding contour 606, but it is a direct result of necessarily having the guiding-in track 634 present.

The guiding-in structure 630, in particular the guiding-in track 631 thereof, is provided in order to restore said rotation again and to move the retaining pendulum 300 into the basic position again once it has passed by the retaining holder 600. The guiding-in structure 630 rotates the rotating pendulum 300 about its axis of rotation 306 once again into the basic position, which is depicted in FIGS. 7A and 7J. This rotation corresponds, in the figures mentioned, to a counterclockwise rotation in the second direction of rotation.

This gives rise overall to a straightforward and reliable retaining-pendulum/retaining-holder combination.

What is claimed is:

1. A lifting system for lifting and/or lowering loads comprising:

a) a lifting apparatus, which is suitable for conveying loads along a lifting direction from a first transfer position into a second transfer position and along a lowering direction from the second transfer position to the first transfer position, and b) a conveying apparatus, which is suitable for receiving, at the first and/or the second transfer position, the loads conveyed by the lifting apparatus, c) wherein the conveying apparatus has at least one retaining pendulum, which can be pivoted into a retaining position, d) wherein the lifting apparatus has at least one retaining holder for the retaining pendulum, e) wherein the retaining pendulum, in the retaining position, can be brought into engagement with the retaining holder, by a movement of the retaining holder in the lowering direction, such that a movement of the lifting apparatus in the lowering direction is blocked and/or the retaining pendulum, in the retaining position, can be brought into engagement with the retaining holder, by a movement of the retaining holder in the lifting direction, such that a movement of the lifting apparatus in the lifting direction is blocked, f) wherein the retaining holder has a first guide track, g) wherein the first guide track is designed so that, when the retaining holder is moving along the lifting direction or the lowering direction, the guide track moves the retaining pendulum into a first position, in which the retaining pendulum cannot be brought into engagement with the retaining holder.

2. The lifting system as claimed in claim 1, wherein the retaining holder has a holding contour, which is designed to hold the retaining pendulum such that a movement of the lifting apparatus in the lowering direction or in the lifting direction is blocked.

3. The lifting system as claimed in claim 1, wherein the retaining pendulum has a movable end which is designed to interact with the first guide track and with the holding contour.

4. The lifting system as claimed in claim 1, wherein the retaining holder has a second guide track, is designed so that, when the retaining holder is moving along the lowering direction or the lifting direction, the guide track brings the retaining pendulum a second position, in which the retaining pendulum cannot be brought into engagement with the retaining holder during the movement thereof.

5. The lifting system as claimed in claim 1, wherein the retaining holder is fixed to the lifting apparatus.

6. The lifting system as claimed in claim 1, wherein the retaining position is located between the first and the second positions.

7. The lifting system as claimed in claim 1, wherein the first and the second positions are located alongside the retaining position.

8. The lifting system as claimed in claim 1, wherein the retaining holder has a guiding-in member for the retaining pendulum, said member being designed to move the retaining pendulum in the direction of the retaining position, and/or wherein the retaining holder has a deflecting member for the retaining pendulum, said member being designed to move the retaining pendulum in the direction of the first and/or of the second position.

* * * * *